April 22, 1969     L. C. COTTS     3,440,400
ELECTRIC DUCT HEATER
Filed Sept. 27, 1966     Sheet 1 of 4
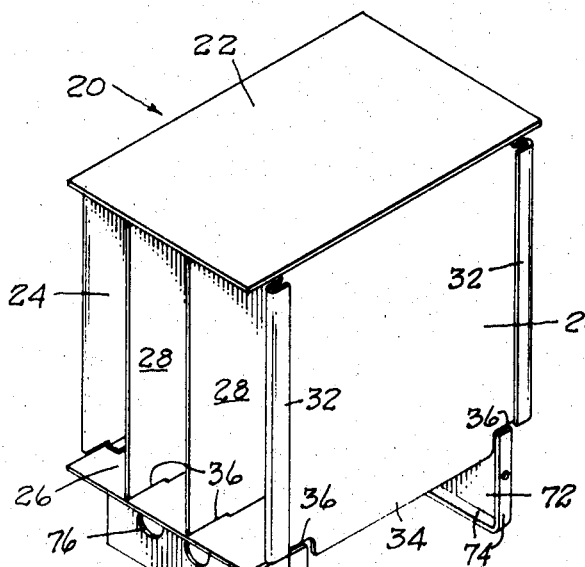
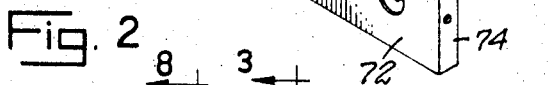
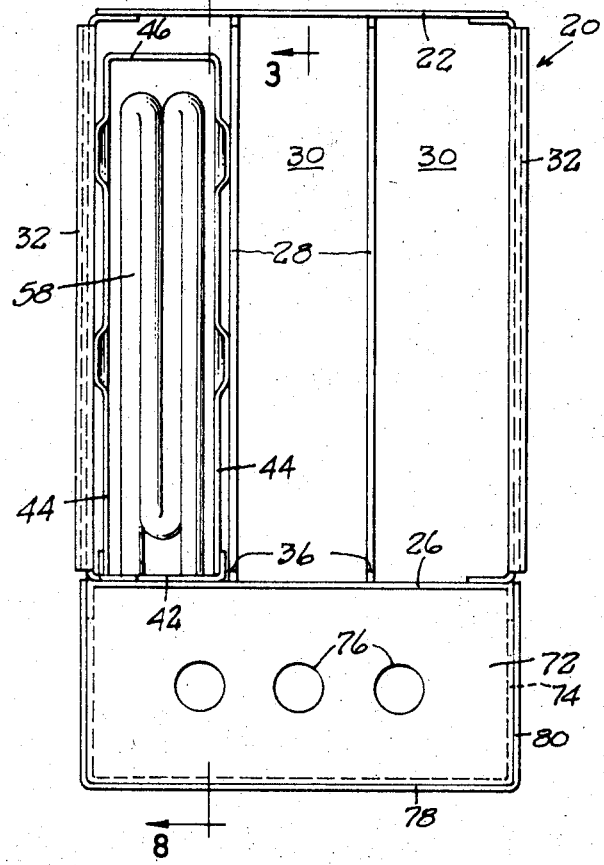
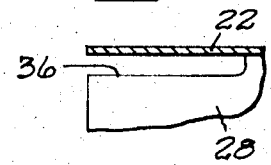
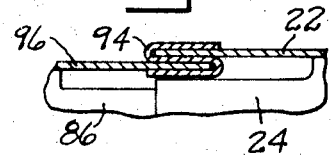
INVENTOR.
LOUIS C. COTTS
BY
ATTORNEY

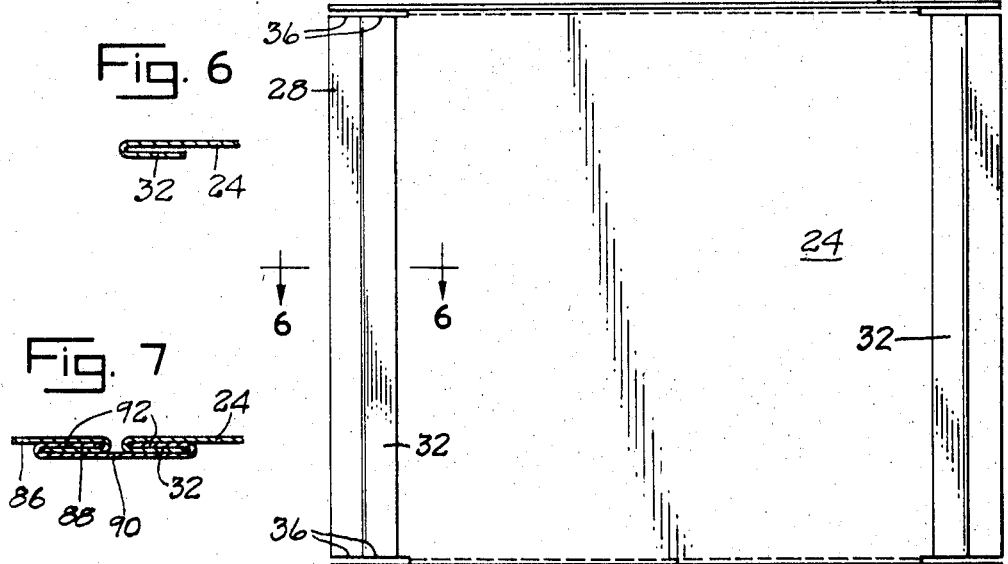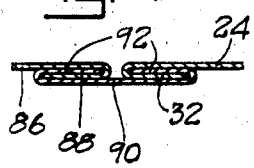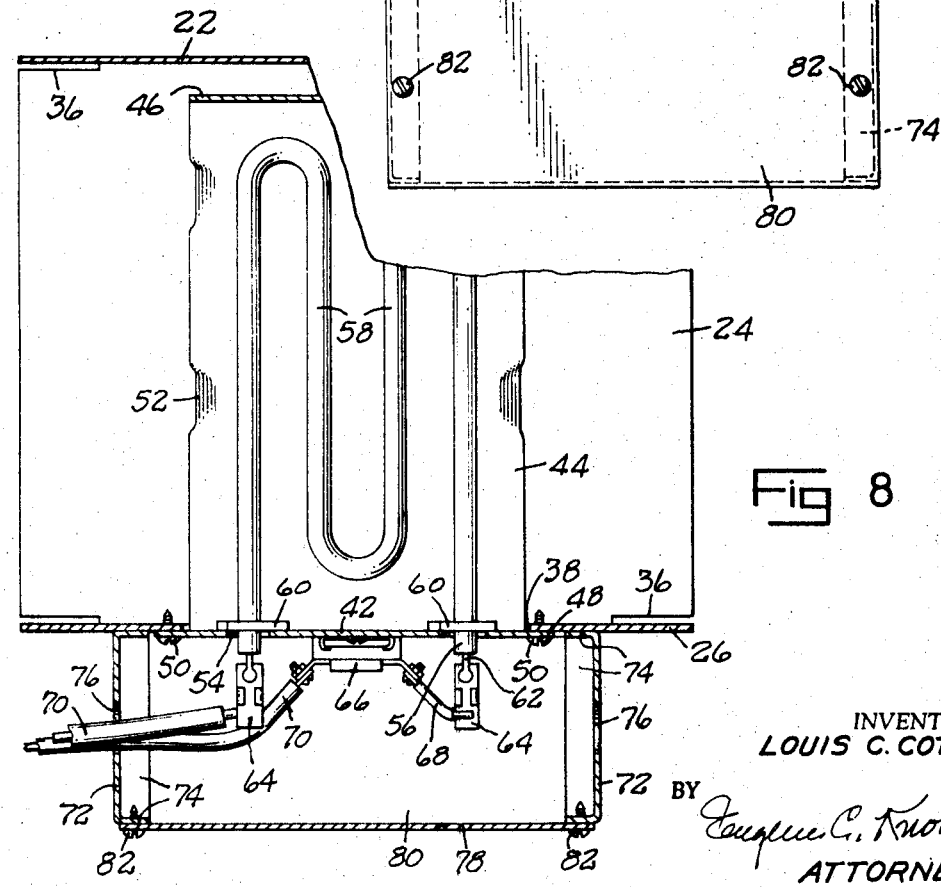

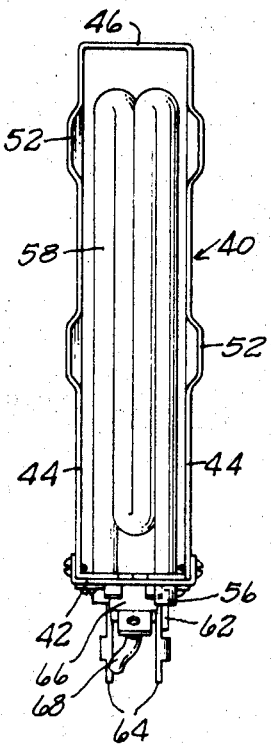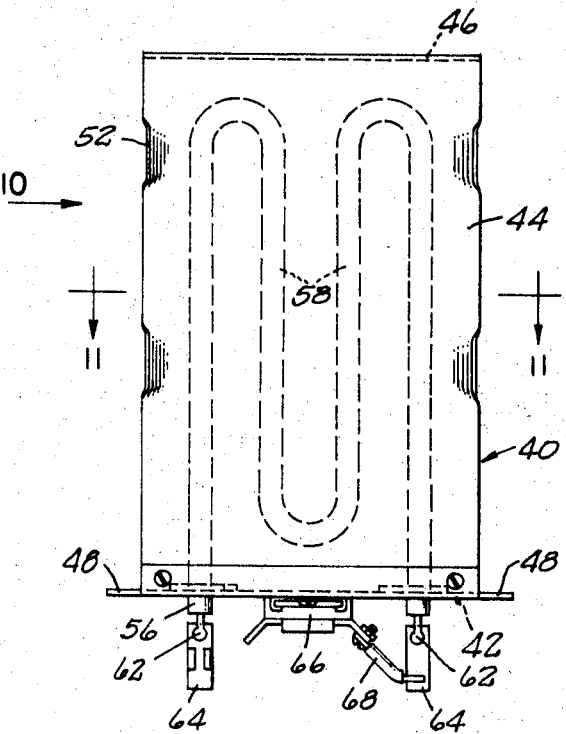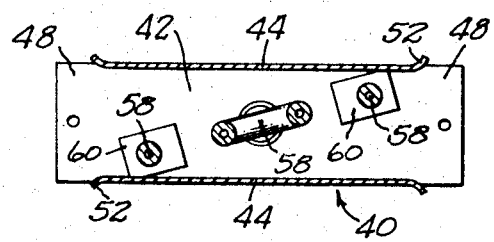

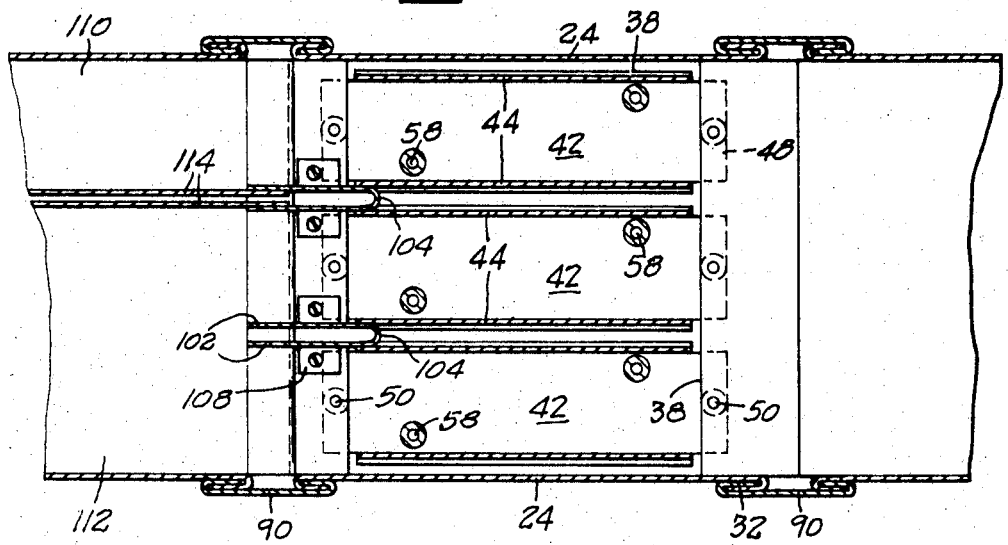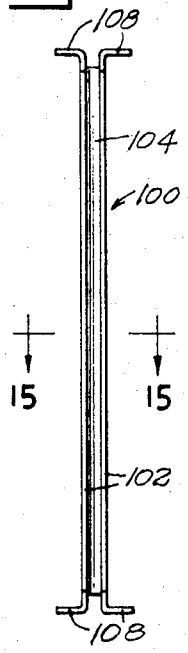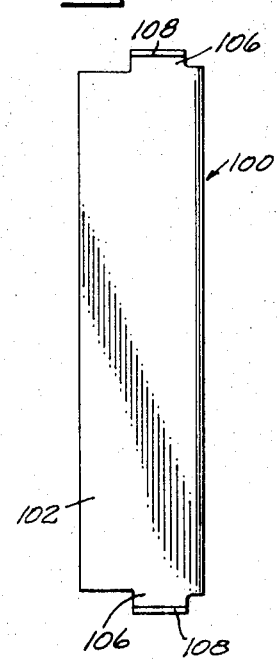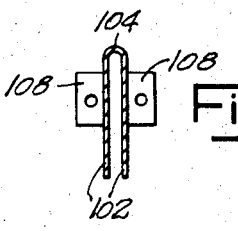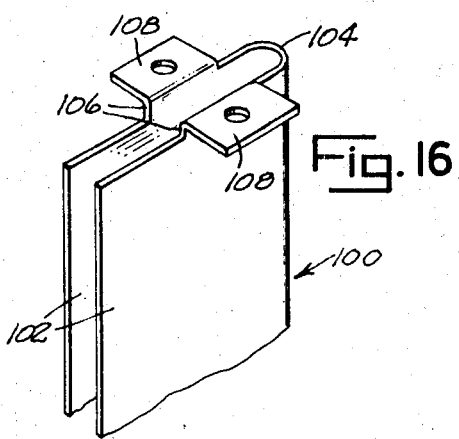

United States Patent Office 3,440,400
Patented Apr. 22, 1969

3,440,400
ELECTRIC DUCT HEATER
Louis C. Cotts, 2512 Oak St.,
Michigan City, Ind. 46360
Filed Sept. 27, 1966, Ser. No. 582,370
Int. Cl. H05b 3/06, 1/00, 11/00
U.S. Cl. 219—367                                9 Claims This invention relates to improvements in electric duct heaters, such those illustrated in my prior patents, No. 3,029,332, dated Apr. 10, 1962, and No. 3,164,715, dated Jan. 5, 1965.

The primary object of this invention is to provide an electric duct heater having a novel housing construction which readily receives electrical heating units of any selected capacity and accommodates removable anchorage of the heating units therein.

A further object is to provide a device of this character having a novel construction of electric heating element carrier.

A further object is to provide a device of this character in which air flows in two separated paths past each electrical heating unit, one path extending through the heating unit so that cold air is heated by the unit, and the other path extending around the heating unit, as between the unit and the housing to insulate the housing and minimize heat losses by radiation from the heating unit.

A further object is to provide a device of this character which is readily mounted in a duct of an existing heating system by the use of fasteners which are conveniently applied.

A further object is to provide a device of this character wherein any selected type of a wide range of types of electric heating elements can be mounted in a housing of any of a selected range of sizes, so that a user can assemble from a comparatively small stock of unassembled housing and heating element components, a device suitable for a particular installation.

Other objects will be apparent from the following specifications:

In the drawings:

FIG. 1 is a perspective view of a housing forming one embodiment of the invention.

FIG. 2 is an end view of the housing as illustrated in FIG. 1 having a heating unit mounted in one part thereof.

FIG. 3 is a fragmentary detail enlarged sectional view taken on line 3—3 of FIG. 2.

FIG. 4 is an enlarged sectional view taken on line 3—3 of FIG. 2 and illustrating the joint connecting the heater housing to a duct.

FIG. 5 is a view of the assembled device in side elevation.

FIG. 6 is an enlarged fragmentary detail sectional view taken on line 6—6 of FIG. 5.

FIG. 7 is a fragmentary view taken on line 6—6 of FIG. 5 and illustrating a joint connecting a side wall of a housing to a side wall of a duct.

FIG. 8 is a fragmentary longitudinal vertical sectional view taken on line 8—8 of FIG. 2.

FIG. 9 is a side elevational view of a heating unit used in the device.

FIG. 10 is an end view of the heating unit viewed in the direction of the arrow 10 in FIG. 9.

FIG. 11 is a fragmentary horizontal sectional view of the heating unit taken on line 11—11 of FIG. 9.

FIG. 12 is a horizontal sectional view of a modified embodiment of the invention.

FIG. 13 is an end view of a part of the device of the embodiment of FIG. 12.

FIG. 14 is a side view of the part shown in FIG. 13.

FIG. 15 is a sectional view taken on line 15—15 of FIG. 13.

FIG. 16 is a fragmentary perspective view of the part shown in FIGS. 13, 14 and 15.

Referring to the drawings, and particularly to FIGS. 1 to 11, which illustrate one embodiment of the invention, the numeral 20 designates the housing of the device. The housing has a plurality of walls, here shown as a top wall 22, a pair of side walls 24 and a bottom wall 26. The housing is preferably formed of sheet metal of suitable gauge. One or more longitudinal vertical partitions 28 are mounted in the housing to extend full-length thereof and to define longitudinal open-ended chambers 30 within the housing. The side walls 24 preferably terminate spaced from and inwardly of the ends of the top wall 22 and bottom 26, being provided with outwardly return bent channel-defining flanges 32. Side walls 24 preferably include intermediate reduced length depending flanges 34. The walls 24 and partitions 28 are cut-away at 36 at the ends thereof to define slots adjacent to the top and bottom walls. One wall, here shown as the bottom wall, has an aperture 38 formed therein spaced from the opposite ends thereof as best seen in FIG. 8.

The housing is adapted to mount one or more heating element assemblies or heating units 40, preferably of the construction illustrated in FIGS. 9 to 11 inclusive. Each heating element assembly includes a carrier having a base plate 42, spaced side walls 44, and a top panel 46. The spacing between the side walls 44 of the carrier is less than the width of a chamber 30, the spacing between the bottom panel 42 and the top panel 46 is less than the vertical dimension of a chamber 30, and the length of the side panels 44 is less than the length of the bottom opening 38. The bottom member 42 has a length greater than the length of the opening 38. This size ratio of the parts of the device permits the insertion of a heating unit into one of the chambers 30 by passing the frame parts 44, 46 thereof through the bottom opening 38 of the housing to bring the projecting portions 48 at the opposite ends of the base plate into engagement with the bottom surface of the bottom panel 26. Suitable securing members, such as metal screws 50, can be used between the parts 48 and 26 to anchor the carrier frame fixedly in the housing in a position as best illustrated in FIGS. 2 and 8. Each of the carrier side walls 44 has a plurality of small laterally outwardly off-set portions 52 formed therein, there preferably being at least one off-set 52 at each end of each side wall. The over-all dimension between the free edges of opposite off-sets 52 engaging the opposite side walls 24, 24 of a chamber 30 is preferably equal to the width of chamber 30, as illustrated in FIG. 2, for the purpose of stabilizing and centering the position of the heater carrier in the housing compartment.

The carrier base 42 has a pair of openings 54 formed therein to receive the opposite end portions 56 of an electric heating element, which may be of the open coil resistance wire type or, as shown, formed of an insulated electrical resitsance heating member 58. Member 58 preferably is of substantially M-form as best seen in FIGS. 8 and 9 and may be positioned to extend diagonally relative to the side walls 44, as illustrated in FIGS. 10 and 11. Suitable insulating washers 60 may be carried by carrier base plate 42 to stabilize the position of the heating elements. Alternatively, the members 60 may constitute washers secured to the end portions 56 of the heating element and serving to position the heating element vertically in its carrier. The electrical conductors forming the end portions 56 of the resistance heating elements 58 are bared at 62 and each has soldered or otherwise anchored thereto a terminal member 64 of a suitable construction.

A thermostatic limit switch 66 is carried by the carrier base plate 42 and is connected to one terminal 64 by lead 68. Lead 70 in the nature of insulated electrical conductors serves to connect the switch 66 and the other terminal 64 of the unit in a suitable heating circuit of the type well understood in the art, and provided with suitable switch means (not shown) under the control of thermostatic switches (not shown) located in the space to be heated.

An enclosure for the electrical terminals 64 and the thermostatic limit switch 66 is carried by the bottom 26 of the housing 20. In the preferred form, a pair of enclosure end plates 72 provided with marginal flanges 74 are secured to the housing bottom adjacent opposite ends thereof and preferably inwardly spaced from the ends of the cut-outs 36 as best seen in FIG. 8. The end plates may be welded or otherwise fixedly secured to the housing bottom 26, preferably with the flanges 74 inturned. At least one end plate 72 has a number of openings 76 therein, preferably equal to the number of chambers 30 in the housing, and these openings accommodate entry of the lead wires 70 therethrough. The enclosure is completed by a U-shaped member having a bottom panel 78 and side walls 80 which fit around the flanges 74 of the end plates 72 and are secured thereto by screws or other securing members 82. Side walls 80 preferably fit around or overlap said flanges 74, as best seen in FIG. 5. This arrangement completely encloses the electrical contacts but renders them readily accessible, and also makes possible ready disassembly of the unit. Thus, replacement of an electrical heating unit can be accomplished by removal of the securing members 82, releasing the part 78, 80 for full and convenient access to the terminals 64 and switches 66 and to the securing members 50 that anchor the electrical heating assemblies in place.

The device is readily connected to the duct or ducts of a forced air circulating system in the manner illustrated in FIGS. 4 and 7. In this connection, it will be understood that the air inlet duct connected at one end to the device will preferably be connected to the top, bottom and side walls of the device, either directly or by means of a conventional boot; while the outlet of the device will usually have a plurality of ducts connected thereto, although in some instances only one duct may be connected at the outlet. The arrangement for connecting the ducts, whether multiple or single, will commonly entail initial connection of the duct with the side walls of the housing. For this purpose, a joint as illustrated in FIG. 7 may be utilized to interconnect a vertical wall of a duct with a vertical wall of the housing. In FIG. 7, the vertical wall of the duct is illustrated at 86 and is provided with an outwardly return bent flange 88. A C-shaped joint member having a web portion 90 and a pair of return bent substantially coplanar flanges 92 serves to interconnect a side wall 24 of the housing and a side wall 86 of the duct by sliding the flanges 92 lengthwise in interlocking relation with housing flange 32 and duct flange 88. The top and bottom walls of the housing and duct are then connected as shown in FIG. 4 by the use of S-clips 94 engaging the lapping portions of the housing walls, such as 22 or 26, and the duct wall 96.

The device provides great versatility with respect to the size of the unit, the number of ducts which can be connected thereto, the heat generating capacity of the heating units associated with each outlet duct and the ability to construct the heating unit of a character to meet specific requirements by the use of selected parts from a small number of parts in stock. Thus, a dealer or installer may stock a small number of different housings and a small number of heating units having heating elements of different capacities and the usual stock of connectors and ducts and boots. From these he can select the elements which the particular installation requires, and can assemble the same without the requirement of special skills or special tools.

Of particular importance is the fact that the heating units define in the carrier part thereof a passage open at both ends and housing the heat generating element therein so that air flow occurs therethrough, and at the same time, air flow can occur around this passage defining structure for maximum efficiency and for the avoidance of heat losses occurring at the unit, as by radiation from the carrier.

It is not necessary that partitions 28 be employed in the housing to divide the housing into chambers 30, and a modified embodiment of the invention eliminating the use of such partitions is illustrated in FIG. 12. In this construction, parts similar to those described previously bear the same reference numerals. The housing of the device is similar to that described above, with the exception of the elimination of the partitions 28. In this construction, the same type of heating element is used as described previously and any selected number thereof may be employed depending upon the size of the housing. The sole partitioning or separating means between the individual heating units constitutes vertical channel members 100, each having spaced parallel side portions 102 and a connection web 104 extending substantially full-length thereof at one side thereof. Extensions 106 of the side walls 102 carry out-turned flanges 108 which are apertured and are secured to the top 22 and the bottom 26 of the housing adjacent one end thereof as illustrated in FIG. 12. The width of the plates 102 is such that the free edges thereof will preferably terminate a plane substantially flush with the edges of the top and bottom panels but spacd therefrom as provided by the extension portions 106. This will permit the fitting of outlet ducts 110 and 112 in cooperating relation to the structure as shown in FIG. 12, as by entry of walls 114 of adjacent ducts into the open side of the channel while the top and bottom walls of the duct pass through the spaces or notches or slots provided by the extensions 106 and slots 36. The flanges 108 are anchored to the bottom panel 26 outwardly of the opening 38 and the innermost portion of the channel including the bent part 104 may project beyond the inner edge of the adjacent bottom wall portion 26 and over the opening 38 so as to fit between the side walls 44 of adjacent electrical heat units, as shown. However, the inner part of member 100 may be positioned outwardly and clear of the adjacent ends of the heating element carriers, if desired. It will be understood that only the number of separations 100 required for positioning at spaces between outlet ducts need be used, and that these can be attached to the housing at the locations required rather than at equal intervals as shown in FIG. 12.

While the preferred embodiment of the invention has been illustrated and described, it will be understood that changes in the construction may be made within the scope of the appended claims without departing from the spirit of the invention.

I claim:

1. An electric duct heater adapted to be connected to inlet and outlet air ducts, comprising a housing having top, bottom and side walls and open at its ends for communication with said ducts, one of said walls having an aperture therein spaced from its ends, a heater carrier mounted in said housing spaced from three of the walls thereof, said carrier defining an open ended heating passage therethrough and cooperating with said housing to define a second passage, and an electric heating element secured to said carrier and positioned within said heating passage, said electric duct heater further having a plurality of carriers mounted in said housing, side by side, to provide a plurality of said heating passages, each adapted to have a heating element therein, and to independently secure each carrier to said housing.

2. An electric duct heater as defined in claim 1, wherein each said carrier includes a mounting plate having end parts underlying and secured to the apertured wall of said housing at opposite ends thereof, said mounting plate supporting said heating element.

3. An electric duct heater as defined in claim 1, wherein said heating element and carrier form a unit and a plurality of said units are mounted in said housing with the adjacent portions thereof defining the sides of said heating passages spaced apart.

4. An electric duct heater as defined in claim 1, wherein each said carrier has a mounting plate supporting said heating element and secured to the apertured wall of said housing, and a thermostatic limit switch carried by said plate and connected to said heating element, said carrier, element and switch constituting a preassembled unit.

5. An electric duct heater as defined in claim 1, wherein each said carrier has a mounting plate supporting said heating element, means securing said mounting plate to the apertured wall of said housing, a thermostatic limit switch carried by said mounting plate and connected to said heating element, electric terminals connected to said heating element and switch projecting outwardly from said mounting plate, and an enclosure carried by the apertured housing wall and enclosing said mounting plate, securing means, switch and terminals, said enclosure including a releasable access part.

6. An electric duct heater as defined in claim 1, wherein said housing has a plurality of partitions extending from end to end thereof and defining open ended compartments for communication with said ducts, each compartment receiving a carrier and a heating element, said carriers being spaced from said partitions.

7. An electric duct heater as defined in claim 1, wherein a plurality of carriers are arranged in said housing to define laterally spaced heating passages, and vertical means close the spaces between carriers communicating with different outlet ducts.

8. An electric duct heater as defined in claim 1, wherein a pair of carriers are mounted in said housing in laterally spaced relation for communication with different outlet ducts, and a vertical member is carried by said housing and aligned with the space between said carriers adjacent said outlet end of the housing, said vertical member being U-shaped in cross-section with its open side outermost.

9. An electric duct heater as defined in claim 1, wherein a pair of carriers are mounted in said housing in laterally spaced relation for communication with different outlet ducts, and a vertical channel member carried by the housing is positioned in alignment with the space between carriers at the outlet end of the housing, the upper and lower ends of said housing side walls, and of said vertical channel being cut-away to define outwardly facing duct-receiving slots.

References Cited

UNITED STATES PATENTS

| 1,863,882 | 6/1932 | Scharf | 165—74 XR |
| 2,481,077 | 9/1949 | Buell | 219—367 |
| 3,164,715 | 1/1965 | Cotts | 219—364 |

FOREIGN PATENTS 251,078 7/1948 Switzerland.

RICHARD M. WOOD, *Primary Examiner.*

A. FRANKEL, *Assistant Examiner.*

U.S. Cl. X.R.

165—74; 219—376, 539